May 28, 1946.   H. W. TAUSCH   2,401,027

DEPOSITION OF RUBBER FROM AQUEOUS DISPERSIONS OF RUBBER

Filed Oct. 21, 1942

POSITIVELY CHARGED RUBBER DISPERSION STABILIZED WITH A CATIONIC SOAP AND CONTAINING AN ADDED CHEMICAL WHICH COAGULATES ONLY NEGATIVELY CHARGED DISPERSIONS.

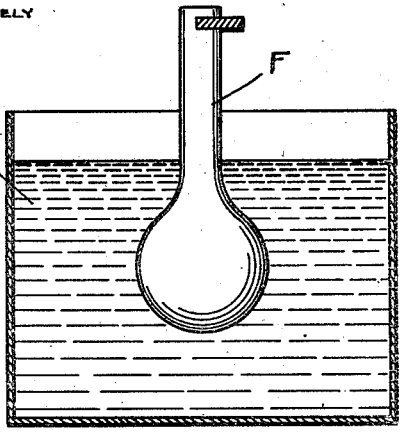

Fig-1

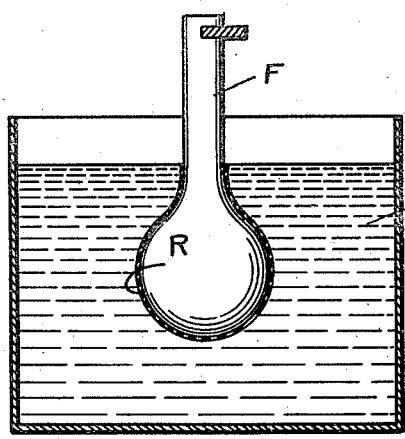

NEGATIVELY CHARGED RUBBER DISPERSION STABILIZED WITH AN ANIONIC SOAP AND CONTAINING AN ADDED CHEMICAL WHICH COAGULATES ONLY POSITIVELY CHARGED DISPERSIONS.

Fig-2

Inventor
Harry W. Tausch
By *Willis F. Avery*
Atty.

Patented May 28, 1946

2,401,027

UNITED STATES PATENT OFFICE 2,401,027

DEPOSITION OF RUBBER FROM AQUEOUS DISPERSIONS OF RUBBER

Harry W. Tausch, Akron, Ohio, assignor to American Anode Inc., Akron, Ohio, a corporation of Delaware Application October 21, 1942, Serial No. 462,841

2 Claims. (Cl. 18—58)

This invention relates to the production of rubber articles by various methods involving the coagulation of aqueous dispersions of rubber, and is particularly concerned with a method in which articles are produced by associating together two rubber dispersions capable of mutually coagulating each other. The invention is useful in connection with the manufacture of articles from dispersions of rubber by various known processes including dipping, spreading, spraying, extruding, and the like, but is especially useful in connection with dipping operations in which shaped articles or coatings are produced by depositing rubber from an aqueous dispersion onto a deposition base or form.

In recent years the manufacture of rubber articles by depositing rubber from such aqueous dispersions of rubber as latex onto a deposition base or form has reached a position of great importance in the rubber industry. This is primarily due to the fact that such rubber is tougher and more elastic as it permits the native rubber structure to remain unbroken, as contrasted with the ordinary milled solid rubber. The manufacture of rubber articles by deposition from aqueous dispersions of rubber has an additional advantage in that it is simple and direct.

There are certain difficulties encountered in using ordinary rubber latex, for example, in manufacturing rubber articles. The nature of latex, or similar rubber dispersions, is such that only certain compounding ingredients can be used. Those compounding materials that might coagulate the latex, unduly thicken it, or react with the preservative used must be avoided. Thus the different types of rubber that can now be produced are somewhat limited. These difficulties, and others mentioned hereinafter, are eliminated by the method of my invention.

By the method of this invention I coagulate aqueous dispersions of rubber to produce rubber deposits on bases or forms by providing two bodies of latex, for example. In one body, by adding a cationic soap to the latex, I produce positively charged rubber particles, as contrasted with ordinary latex having negatively charged particles. This not only reverses the charge on the individual rubber particles from negative to positive but also stabilizes the dispersion. The other body of latex is permitted to retain its normally negative charge. The aqueous dispersions are then coagulated to produce rubber articles by associating the two oppositely charged dispersions together, either by spraying the two in contacting streams such as commingling streams, immersing a deposition form first in one and then in the other, or by any similar method. As the two dispersions are oppositely charged the charges on one serve to coagulate the other, thereby effecting mutual coagulation and rapidly building up a rubber deposit.

In the popular method now used for depositing rubber from aqueous dispersions of rubber it is common practice to immerse a deposition form, for example, in a solution of a coagulant and then in an aqueous dispersion of rubber to produce a rubber deposit. In such procedure, the step of immersing the form in coagulant is, in one sense, wasted as no rubber is deposited on the form during that operation. Likewise, most coagulant solvents or vehicles now used are volatile organic liquids with the ever-present danger of fire and explosion, and most of the solvents are also highly toxic. My invention removes these dangers and also eliminates the expense of the solvents. In my invention there is no waste movement as every immersion produces a coating of rubber on the deposition form.

There is still another advantage in the method of my invention over the methods used heretofore. It is well known that ordinary alkali preserved latex, or other aqueous dispersions of rubber, comprise particles that are negatively charged. In compounding these dispersions it is absolutely necessary that no compounding agents carrying positive charges be used as these will cause the dispersion to coagulate immediately. This limits the number and kind of compounding agents that can be used in the dispersion and as the characteristics of the deposited rubber are dependent to a large extent upon the compounding agent, it also limits the types of rubber compositions that can be produced. By using the method of my invention, however, it is immaterial whether the compounding agents such as vulcanizing agents, accelerators, age-resisters, softeners, tackifiers, and the like have particles with a positive charge, negative charge, or no charge at all, although they preferably should be migratory materials. In the case of compounding agents having positive charges they are added to the positively charged dispersion. Similarly, compounding agents having negative charges are added to the negatively charged dispersion. Then when the deposition form is immersed first in one dispersion and then in the other dispersion, a rubber deposit is produced containing all the compounding agents that were added to both dispersions, the preferred migratory agents migrating from layers of one composition into adjacent layers of the other composition. In this way it is possible to make rubber articles having widely varying characteristics. It also opens up wholly new fields in the rubber compounding art.

I am well aware that it has been proposed in the past to make rubber deposits by immersing a form alternately into an acid latex and then into an alkaline latex. Here the acid latex is given a positive charge on the particle by adding large quantities of protective agents or stabilizers to the latex and then adding a strong acid in an amount in excess of the amount needed to cause coagulation. This method has many inherent weaknesses and disadvantages which are illustrated in the poor quality of the rubber produced. The large amounts of protective agents weaken the rubber and render it completely unsuited for many purposes. The excess acid necessarily used in the prior art method in order to effect a reversal of electrical charge on the rubber particles has a destructive effect on the rubber, causing the rubber to have poor aging properties, poor vulcanizing properties, and a high degree of stickiness or tack. Also, the acid reacts with and destroys many of the compounding ingredients necessary in producing strong, long-lasting rubber. The acid attacks metal forms, metal containers, and the like, complicating the problem of proper storage and causing discoloration and decomposition of the latex. The destructive action of the acid in the prior art method is due to the fact that latex shipped to this country has a pH of around 10.5–11.0. The isoelectric pH of this latex is in the range of 3.8 to 4.8, which means that in order to reverse the charge from negative to positive the pH must be lowered to below this isoelectric point. In actual practice it has been found that in order to reverse the charge and to maintain it positive it is necessary to reduce the pH to not more than around 2.3 to 2.6. This requires so much acid that the excess not only is destructive to the rubber particles and to certain compounding ingredients but it also attacks metal forms, metal containers, and the like. By the method of my invention no acid is necessary in order to reverse the charge, and positively charged dispersions may be produced without encountering these dangers.

In reversing the charge on the latex particles by the acid method the pH of the final product determines whether the charge is positive or negative. In order to have a positive charge the pH must be considerably below 7.0. By the method of this invention, however, the charge is not dependent on the pH and a positively charged dispersion may be obtained with a pH below 7.0, at 7.0, or above 7.0. This factor is very important in latex compounding as a pH may now be chosen for the latex to suit the nature of the desired compounding ingredients.

In preparing my aqueous dispersions of rubber the negatively charged dispersion may be the ordinary aqueous dispersions now used, of which ammonia preserved latex of commerce is a good example. The negatively charged dispersion may likewise be one that is stabilized with an anionic soap, such as the ordinary soaps now in common use. These soaps include the sodium or potassium salts of palmitic acid, stearic acid, oleic acid, linoleic acid, or similar fatty acids. These soaps are very useful in preparing artificial aqueous dispersions of reclaimed rubber, and the like, but they are also quite valuable in stabilizing ordinary negatively charged natural latex. This is particularly true when it is desired to eliminate the use of ammonia as a preservative in order to change the pH of the latex. Latex stabilized with an anionic soap will be negatively charged and such charge will be completely independent of pH. In stabilizing latex the anionic soap may be added to the freshly-collected latex as it comes from the tree, or ammonia preserved latex may be stabilized with an anionic soap and the ammonia then removed, as by blowing.

The positively charged dispersions used in this invention are those stabilized with a cationic soap. These cationic soaps usually consist essentially of a long-chain aliphatic residue attached to a radical that ionizes in solution to give a positive ion. These cationic soaps are usually quaternary ammonium, sulfonium, or phosphonium salts of aliphatic fatty acids having eight or more carbon atoms in the aliphatic chain. Typical examples are cetyl pyridinium bromide, cetyl tri-methyl ammonium chloride, cetyl dimethyl sulfonium methyl sulfate, and dodecyl tri-methyl ammonium bromide. There are, of course, many other soaps of similar nature which are capable of producing positively charged aqueous dispersions of rubber.

In making up the positively charged dispersions a water solution of the cationic soap is added to an ordinary aqueous dispersion of rubber in an amount slightly greater than that normally required for flocculation of the rubber. In using ordinary ammonia preserved latex it is not necessary to remove any of the ammonia as the formation of positively charged dispersions is not dependent upon the pH of the dispersion. If it is desired, positively charged latex may be prepared with freshly collected latex just as it comes from the rubber tree and the cationic soap serves to stabilize the latex, a bactericide also being added in many cases.

If desired, the positively charged dispersion may be prepared by dispersing reclaimed rubber in water. In this case it is preferred that the dispersion of reclaimed rubber be prepared by the method set out in my copending application, Serial No. 449,359, filed July 1, 1942. These dispersions are positively charged from the time of their formation and are ideally suited for use in this invention.

As set out hereinabove, rubber articles may be made on a base or form by coating the base or form with the positively charged dispersion and the negatively charged dispersion. In using a deposition form the form should be immersed first in one of the dispersions and then in the other dispersion to give an over-all coating of rubber. These alternate immersions can be continued until a deposit of a required thickness has been built up.

Although rubber deposits can be very satisfactorily produced by using the rubber dispersions per se, it is usually preferred that coagulating chemicals be added to one or both of the dispersions in order to speed up the coagulation. This is done by adding to the positively charged dispersion a coagulant that will coagulate negatively charged particles only, and adding to the negatively charged dispersion a coagulant that will coagulate positively charged particles only. Thus, each dispersion will be stable but when brought into contact with the other, the coagulant in one dispersion will accelerate coagulation of the other dispersion. Such a procedure is illustrated in the accompanying drawing, of which, Fig. 1 is an elevation, partially in cross-section, showing a form immersed in a positively charged rubber dispersion stabilized with a cationic soap and containing an added chemical which coagulates only negatively charged dispersions, and Fig. 2 is a similar view showing the next step of immersing the form in a negatively charged dispersion stabilized with an anionic soap and containing an added chemical which coagulates only positively charged dispersions.

Referring to the drawing, a deposition form F is immersed in the positively charged dispersion to apply to the form a coating of the dispersion by wetting. The coated form is then immersed in the negatively charged disperson where mutual coagulation takes place between the layer of positively charged dispersion and the negatively charged dispersion, thereby forming a layer of coagulated rubber R on the form. This mutual coagulation is a result of two substantially simultaneous actions, the first action being the particles of one charge neutralizing those of the opposite charge, and the second action being the result of the coagulant present in each dispersion. The alternate immersions may be repeated to build up any desired thickness of coagulated rubber.

In this invention where a form or the like is associated first with one dispersion and then with the other, it is immaterial whether such association is made first with the positive dispersion or first with the negative dispersion. It is merely a matter of choice as the results are the same in both cases.

The coagulants that can be added to the positively charged dispersions include any of the ordinary coagulants now used to coagulate ordinary latex. These include in general the acids, especially the weak acids, and salts of metals, particularly salts of polyvalent metals. Salts of polyvalent metals are by far the most important at present and include such compounds as calcium chloride, calcium nitrate, zinc chloride, zinc nitrate, aluminum sulfate, and the like. These coagulants all have a strong coagulating effect on negatively charged particles as on ionization they give positive ions bearing a plurality of positive charges.

The coagulants that are added to negatively charged dispersions must be those chemical compounds which on ionization give active negative ions. These compounds are salts of strong bases and weak acids. The most important of these include such compounds as potassium ferrocyanide, sodium ferrocyanide, potassium ferricyanide, sodium ferricyanide, sodium phosphate, potassium phosphate, and the like.

This invention may be more easily understood by reference to the following examples:

Example I

Positively charged latex is prepared by providing 2000 grams of concentrated 60% rubber latex and adding to this latex 100 grams of cetyl dimethyl sulfonium methyl sulfate dissolved in water, together with water dispersed sulfur, accelerator, antioxidant, and other compounding ingredients as desired. A body of negatively charged latex is prepared by providing an ordinary ammonia preserved latex of commerce containing the usual compounding materials. Then a rubber deposit is made on a deposition form by immersing the deposition form alternately in the two latices. It will be found that a smooth even deposit of rubber has been produced on the deposition form.

Example II

A positively charged dispersion of latex is prepared as set out in the preceding example. To this positively charged dispersion is added 50 grams of calcium nitrate dissolved in water to serve as a coagulant for a negatively charged dispersion. A negatively charged dispersion of latex is provided as in the preceding example. A form is coated with rubber by immersing the form alternately into the two latices.

Example III

A positively charged latex dispersion and a negatively charged latex dispersion are prepared as set out in Example I. To 2000 grams of the negatively charged dispersion is added 45 grams of potassium ferro-cyanide dissolved in water. A form is then coated with rubber by immersing the form alternately into the two dispersions.

Example IV

A positively charged latex dispersion containing calcium nitrate is prepared as set out in Example II. A negatively charged latex dispersion containing potassium ferrocyanide is then prepared as set out in Example III. These latices are used to coat a deposition form with rubber by immersing the deposiiton form first in one latex and then in the other.

Example V

A positively charged aqueous dispersion of reclaimed rubber is prepared by dispersing 1000 grams of reclaimed rubber and 65 grams of the dimethyl sulfate salt of the diethyl-amino-ethylamide of oleic acid in 900 grams of water by mixing in an internal mixer until the water phase becomes continuous and the rubber phase becomes discontinuous. A negatively charged dispersion of reclaimed rubber is prepared as above except that instead of using the cationic soap there is substituted sodium oleate. These two dispersions are then used for coating a form with rubber by immersing the form alternately in the two dispersions.

Example VI

Two dispersions of reclaimed rubber are prepared, one positively charged and the other negatively charged, as set out in the preceding example. To the positively charged dispersion there is added 30 grams of calcium nitrate and to the negatively charged dispersion there is added 30 grams of sodium ferricyanide. A deposition form is coated with rubber from these dispersions by immersing the form alternately into the two dispersions.

In each of the above examples any of the usual compounding ingredients may be added to the aqueous dispersions to provide any property or properties desired in the finished deposited rubber and the deposits produced as described may be subjected to the customary drying, vulcanizing and similar finishing treatments. The invention is applicable both to naturally occurring dispersions of rubber materials and artificially prepared dispersions of synthetic as well as natural and/or reclaimed rubber materials.

Having described my invention in considerable detail as to specific examples and definite chemical compounds employed, it is my desire that the invention be not limited by these details but rather construed broadly within the spirit and scope of the invention as set out in the following claims.

I claim:

1. The method of preparing a rubber deposit which comprises associating an aqueous dispersion of rubber comprising positively charged particles stabilized with a cationic soap and containing an added coagulating chemical which coagulates only negatively charged particles with a second rubber dispersion comprising negatively charged particles stabilized with an anionic soap and containing an added coagulating chemical which coagulates only positively charged particles.

2. The method of preparing a rubber deposit which comprises associating an aqueous dispersion of rubber comprising positively charged particles stabilized with a cationic soap and containing an added coagulating chemical which coagulates only negatively charged particles with a second rubber dispersion comprising negatively charged particles and containing an added coagulating chemical which coagulates only positively charged particles, both said dispersions being in an uncoagulated condition when brought into association and thereafter being mutually coagulated by action of one on the other.

HARRY W. TAUSCH.